(12) United States Patent
Salmon et al.

(10) Patent No.: US 6,350,090 B1
(45) Date of Patent: Feb. 26, 2002

(54) ANCHORAGE ASSEMBLY

(75) Inventors: James Lee Salmon; Bradley Napier Doman, both of Ann Arbor; Christian Michael Norton, Wixom; Timothy William Taylor, Canton, all of MI (US)

(73) Assignee: Ford Global technologies, Inc., Dearborn, MI (US)

( * ) Notice: Subject to any disclaimer, the term of this patent is extended or adjusted under 35 U.S.C. 154(b) by 0 days.

(21) Appl. No.: 09/563,141

(22) Filed: May 2, 2000

(51) Int. Cl.⁷ .................................................. B60P 7/08
(52) U.S. Cl. ........................ 410/106; 410/101; 410/102; 410/110; 410/296; 410/100.07; 410/57.1
(58) Field of Search .................................. 410/101, 102, 410/16, 110, 116; 296/100.07, 57.1, 43; 24/115 K; 248/499; 292/DIG. 29

(56) References Cited

U.S. PATENT DOCUMENTS

| | | |
|---|---|---|
| 2,465,621 A | 3/1949 | Wheeler |
| 3,259,353 A * | 7/1966 | Webb .......................... 410/116 |
| 3,373,464 A | 3/1968 | Ausnit |
| 3,421,726 A * | 1/1969 | Gette .......................... 410/110 |
| 4,607,991 A * | 8/1986 | Porter ......................... 410/110 |
| 4,657,299 A * | 4/1987 | Mahan ...................... 296/43 X |
| 4,739,528 A | 4/1988 | Allen |
| 4,877,361 A * | 10/1989 | DeRosa et al. .......... 410/116 X |
| 4,991,271 A | 2/1991 | Bauer |
| 5,051,047 A * | 9/1991 | Loncaric .................. 410/110 X |
| 5,139,375 A | 8/1992 | Franchuk |
| 5,443,341 A | 8/1995 | Hamilton |
| 5,476,349 A * | 12/1995 | Okland .................... 410/101 X |
| 5,606,784 A * | 3/1997 | Hamamoto ............. 410/116 X |
| 5,636,893 A * | 6/1997 | Wheatley et al. ....... 296/100.07 |
| 5,738,471 A * | 4/1998 | Zenter et al. ................ 410/110 |
| 5,823,725 A * | 10/1998 | Goodwin ................ 410/102 X |
| 5,827,023 A | 10/1998 | Stull |
| 5,915,900 A * | 6/1999 | Boltz .......................... 410/110 |

* cited by examiner

Primary Examiner—Stephen T. Gordon
(74) Attorney, Agent, or Firm—Ford Global Technologies, Inc.

(57) ABSTRACT

An anchorage assembly 10 which includes a generally rectangular housing 16, an anchor member 20, and a resilient and deformable material or member 28 which is coupled to member 20 and which engages housing 16, thereby regulating or controlling the movement of member 20 relative to housing 16 and absorbing vibration and impact loads imparted upon member 20.

14 Claims, 4 Drawing Sheets

ANCHORAGE ASSEMBLY

(1) FIELD OF THE INVENTION

This invention relates to an anchorage assembly and more particularly, to anchorage assembly which is operatively mounted to a vehicle and which includes a movable member onto which vehicle components or accessories may be selectively attached.

(2) BACKGROUND OF THE INVENTION

Anchorage assemblies are typically mounted upon a vehicle and provide an anchor or member onto which vehicle components and accessories may be selectively attached. One type of anchorage assembly, commonly referred to as a latch striker assembly, is fixedly and rigidly coupled to the frame or body of a vehicle (e.g., to a portion of a vehicle pick-up or cargo box) and allows vehicle components and accessories, such as tonneau covers, tailgates, rear doors, and other assemblies, to be securely attached to the vehicle and/or held in an operative position. For example and without limitation, a latch striker assembly typically includes an anchor or striker member which is selectively received or engaged by a latch mechanism that is disposed upon a vehicle component and/or accessory (e.g., a tonneau cover and tailgate). When engaged, the latch mechanism and striker assembly cooperatively hold the vehicle component and/or accessory in an operative, "secured" or closed position.

One drawback associated with these prior anchorage or latch striker assemblies arises from their fixed and rigid attachment to the frame or body of the vehicle. That is, due to the fixed and rigid attachment of the anchor and/or striker to the frame of the vehicle, vibration and impact loads generated during operation of the vehicle are transferred directly from the frame or body of the vehicle to the assemblies or components that are attached to the anchor or striker.

There is therefore a need for a new and improved anchorage or latch striker assembly for use on a vehicle which includes a member which is adapted to be received or engaged by a latch mechanism and which is movable with respect to the vehicle effective to substantially reduce the amount of high frequency vibration and other loads which are transferred to the latch mechanism.

SUMMARY OF THE INVENTION

It is a first object of the present invention to provide an anchorage assembly which overcomes some or all of the previously delineated drawbacks of prior latch striker assemblies.

It is a second object of the present invention to provide an anchorage assembly which allows a vehicle accessory or component, such as a tonneau cover, to be selectively and operatively mounted upon a vehicle.

It is a third object of the present invention to provide an anchorage assembly which is selectively mounted to a vehicle, which is selectively received by a latch mechanism, and which substantially reduces the amount of vibration which is transferred to the latch mechanism during operation of the vehicle.

It is a fourth object of the present invention to provide an anchorage assembly for use in combination with a vehicle body, and which includes a housing which is fixedly coupled to the vehicle body and a striker which is movable with respect to the housing and the vehicle body.

According to a first aspect of the present invention an anchorage assembly is provided. The anchorage assembly is adapted for use in combination with a vehicle having a body. The anchorage assembly includes a housing which includes an interior cavity and which is selectively mounted to a portion of the body. The anchorage assembly further includes a member having a first portion which is disposed within the interior cavity and a second portion which extends from the housing, and a resilient material which is disposed within the interior. cavity, and which abuttingly engages the first portion of the member and the housing, effective to allow the member to controllably move relative to the housing.

According to a second aspect of the present invention, a method is provided for attaching a component to a vehicle. The method includes the steps of providing a latch mechanism; disposing the latch mechanism on the component; providing a housing having a cavity; providing an anchor having a first portion and a second portion; disposing the first portion of the anchor within the cavity, effective to allow the anchor to be movable relative to the housing; providing a deformable material; disposing the deformable material within the cavity, effective to regulate the movement of the anchor relative to the housing; fixedly mounting the housing onto the vehicle; and coupling the latch mechanism to the anchor, thereby attaching the component to the vehicle and allowing the component to be movable relative to the vehicle in a regulated manner.

These and other features, aspects, and advantages of the present invention will become apparent by reading the following detailed description of the preferred embodiment of the invention and by reference to the following drawings.

DETAILED DESCRIPTION OF THE PREFERRED EMBODIMENT OF THE INVENTION

Figure 1:
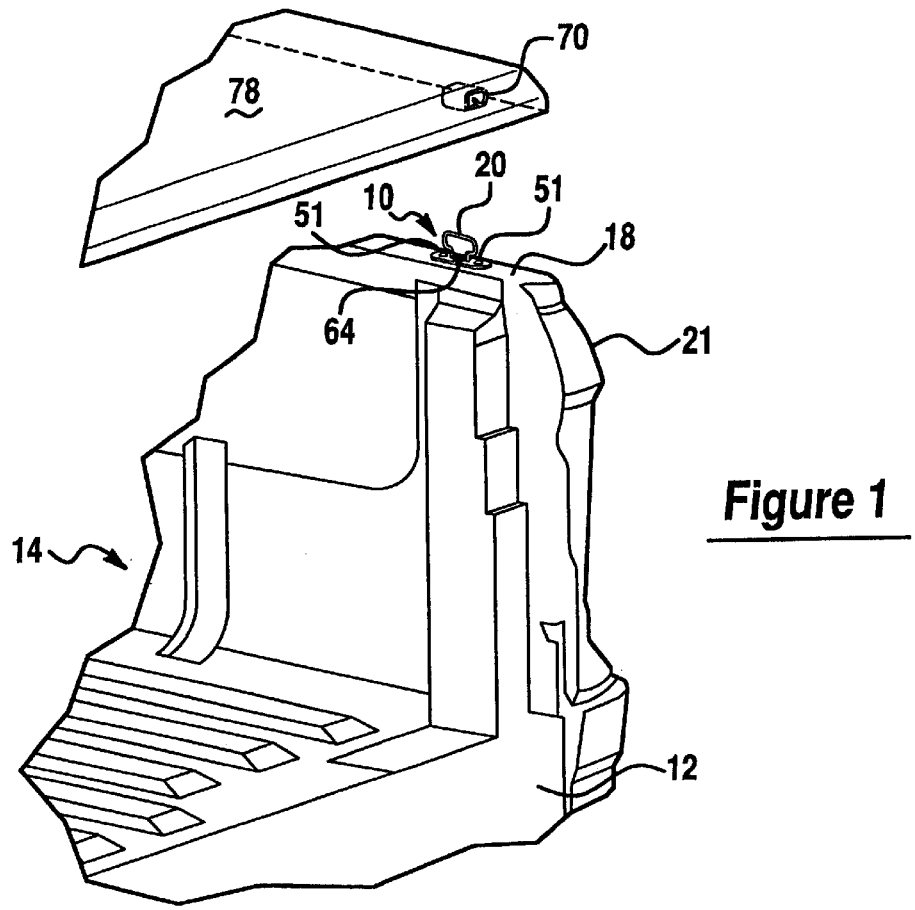
FIG. 1 is a perspective view of an anchorage assembly which is made in accordance with the teachings of the preferred embodiment of the invention and which is operatively mounted to a vehicle cargo box.
Figure 2:
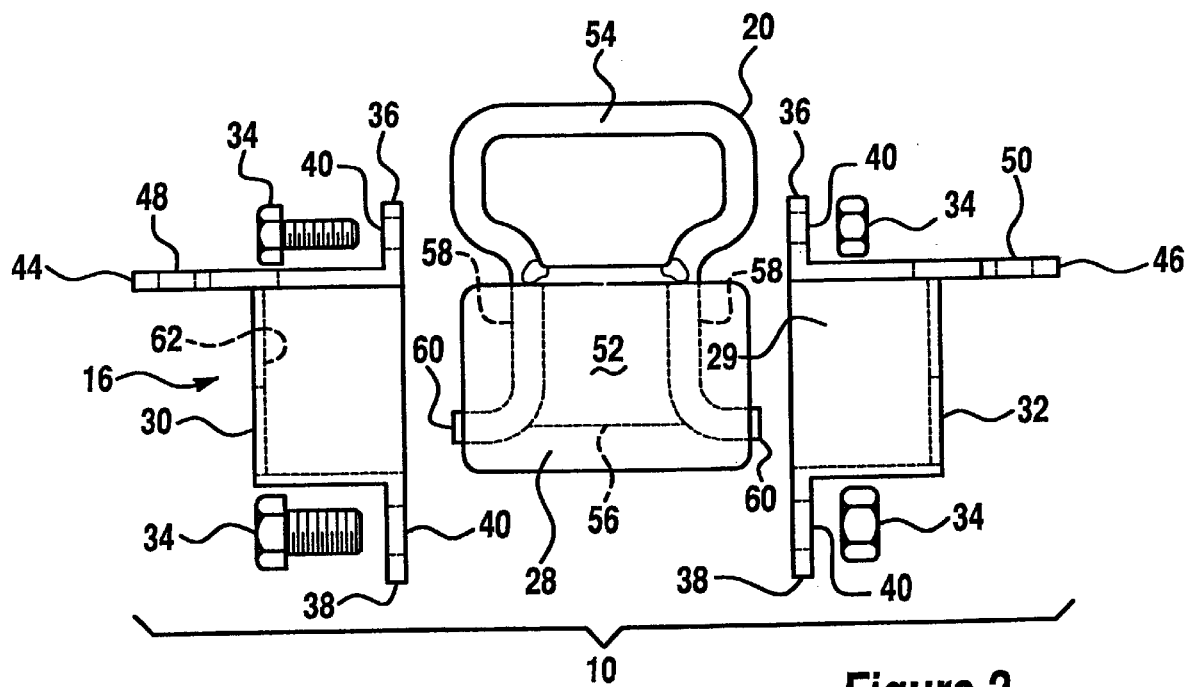
FIG. 2 is an exploded view of the anchorage assembly shown in FIG. 1.
Figure 3:
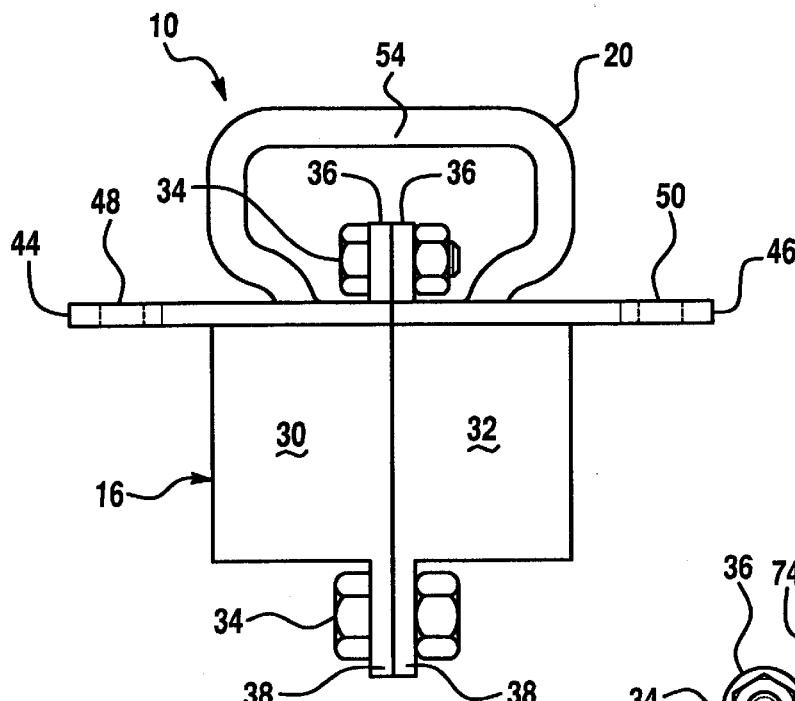
FIG. 3 is a front view of the anchorage assembly shown in FIG. 1.
Figure 4:
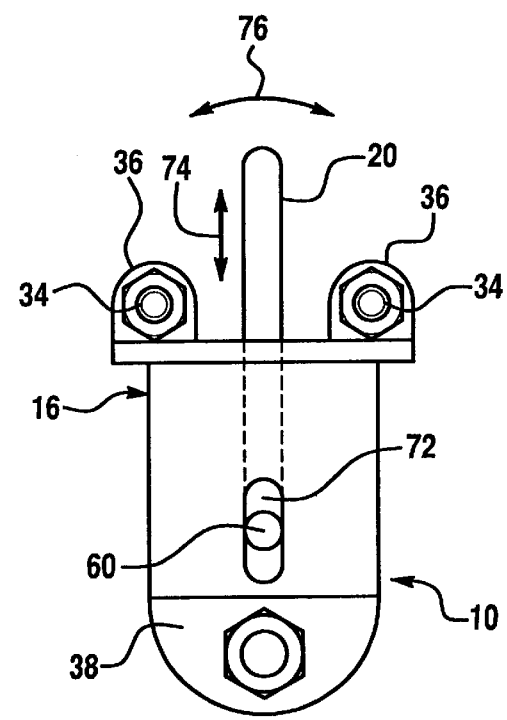
FIG. 4 is a side view of the anchorage assembly shown in FIG. 1.
Figure 5:
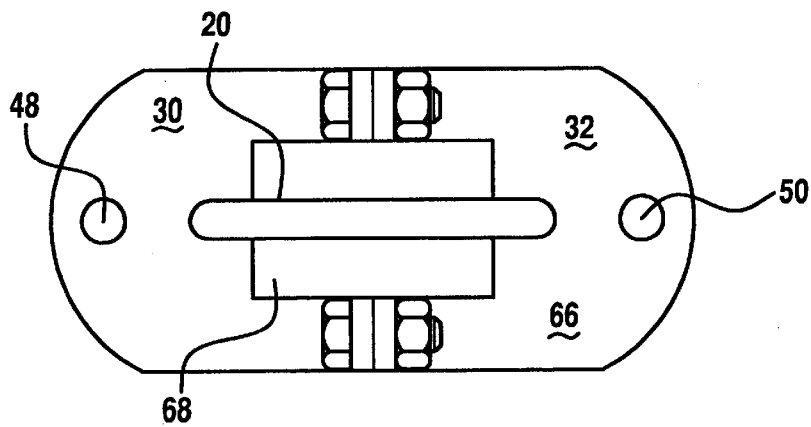
FIG. 5 is a top view of the anchorage assembly shown in FIG. 1.

Referring now to FIGS. 1–5, there is shown an anchorage assembly or a latch striker assembly 10 which is made in accordance with the teachings of the preferred embodiment of the invention and which is adapted to be selectively mounted upon a vehicle body 12 and more particularly to a cargo box 14 of a vehicle body 12. While the following discussion relates to the use of assembly 10 in combination with a cargo box of a vehicle, it should be appreciated that assembly 10 may be mounted upon and/or used in combination with other portions of a vehicle and/or a vehicle body or virtually any other type of moving or vibrating structure to which components or accessories are selectively and desirably attached.

Anchorage assembly 10 includes a generally rectangular housing 16 which includes a central cavity 29, an anchor, striker or member 20 which is partially disposed within cavity 29, and a resilient and deformable material or member 28 which is coupled to member 20 and which is disposed within cavity 29. Material 28 engages housing 16 and "controls", regulates and/or limits the frequency of the movement of member 20 relative to housing 16, thereby absorbing vibrations and impact loads imparted upon and/or transferred to member 20.

In the preferred embodiment of the invention, housing 16 includes two substantially identical portions, halves or members 30, 32 which are each preferably manufactured from a relatively strong and substantially durable and rigid material such as a metal or composite material. Members 30, 32 are selectively attached together to cooperatively form housing 16. In the preferred embodiment, members 30, 32 are selectively coupled together by the us e of substantially identical and conventional fastening assemblies 34 which may comprise bolt and/or screw type assemblies. Particularly, each member 30, 32 includes a pair of substantially identical vertically projecting "upper" flanges 36 and a vertically projecting "lower" flange 38. Each of flanges 36, 38 includes an aperture 40 which selectively receives fasteners 34, thereby allowing members 30, 32 to be selectively coupled together. In other alternate embodiments, members 30 and 32 are selectively welded or heatably joined together in a conventional manner.

Cavity 29 is generally rectangular and is bounded by the interior surface 62 of housing 16. A generally rectangular "top" aperture 68 is formed within the top surface 66 of housing 16 and communicates with cavity 29.

Housing 16 further includes a pair of substantially identical horizontally projecting flanges 44, 46 which extend from the top surface 66 of housing 16. Flanges 44, 46 respectively include apertures 48, 50 which selectively receive conventional fasteners 51, thereby allowing housing 16 to be selectively mounted or attached to the cargo box 14 of vehicle body 12, and more particularly, to the top surface 18 of side wall 21 of cargo box 14.

Anchor or member 20 includes a generally rectangular body portion 52 which is disposed within cavity 29 and a generally rectangular "loop" or "eye" portion 54 which extends through aperture 68. Portion 54 is adapted to be selectively received or engaged by a conventional latch mechanism or fastener, such as latch mechanism 70 shown in FIG. 1. Body portion 52 of member 20 includes a generally square-shaped member or portion 56 that is fixedly attached (e.g., welded) to outer portions 58 which are integrally formed with eye 54. Outer portions 58 include a pair of substantially identical orthogonally projecting members or protrusions 60. Protrusions 60 extend through and mate with a pair of substantially identical slots 72 which are integrally formed within housing 16 and which limit or restrain the movement of member 20 relative to housing 16. As shown best in FIG. 4, slots 72 allow member 20 to be movable relative to housing 16 and within aperture 68 in the "vertical" directions illustrated by arrows 74 and in the pivotal directions illustrated by arrows 76.

Resilient material, plug, or member 28 is generally rectangular in shape and is made or formed from a conventional resilient and deformable material such as rubber, plastic, or any other suitable resilient and deformable material. Member 28 is formed around or coupled to body portion 52 of anchor 20 in a conventional manner. In the preferred embodiment of the invention, material 28 is formed around body portion 52 by use of a conventional molding process. In other alternate embodiments, member 20 is placed into cavity 29 and material 28 subsequently inserted (e.g., injection molded) into cavity 29.

When anchorage assembly 10 is assembled, material 28 abuttingly engages the interior surface 62 of housing 16, thereby controlling, restraining and/or regulating the movement of member 20 relative to housing 16. That is, when housing 16 is assembled, material 28 holds or retains member 20 in a substantially "centered" position with respect to housing 16 and aperture 68, as shown best in FIGS. 4 and 5. When forces are imparted upon member 20, material 28 deforms and allows member 20 to move in a "controlled" or regulated manner in the direction(s) of respective force(s) (e.g., in the directions of arrows 74 and 76). Furthermore, the resiliency of material 28 returns member 20 to its original or "centered" position when the forces are "removed" or released from member 20.

In operation, housing 16 is selectively mounted to the side wall 21 of a vehicle cargo box 14. In the preferred embodiment, housing 16 is shaped to conformably fit within a conventional stake pocket hole 64 formed within the top surface 18 of side wall 21. A conventional latch or fastening mechanism, which is coupled to a vehicle component or accessory (e.g., latch 70 which is coupled to tonneau cover 78), selectively receives or engages anchor or member 20 in a conventional manner, thereby connecting the component or accessory (e.g., tonneau cover 78) to cargo box 14. When the vehicle is driven, vibrations and other forces are imparted upon the anchorage assembly 10 from the vehicle body 12 and from the attached component or assembly (e.g., tonneau cover 78). When forces are imparted upon member 20 in the directions illustrated by arrows 74 and/or 76, material 28 deforms and allows member 20 to controllably pivot and/or move relative to housing 16 and cargo box 14 in the directions of the respective forces. Material 28 absorbs and/or dampens vibrations and other loads which are imparted upon the anchor 20, and is effective to substantially prevent impact loads from being directly and wholly transferred to latch 70 and tonneau cover 78, thereby protecting latch 70 and tonneau cover 78. The resiliency of material 28 causes member 20 to become "re-centered" once the forces imparted upon member 20 are substantially removed and/or altered. By allowing the tonneau cover 78 or other attached component to "float" or move relative to the cargo box 14 in a controlled and/or regulated manner, the loads generated at the latch mechanism 70 are substantially reduced and the likelihood of failure and/or deformation of the latch mechanism 70 and tonneau cover 78 is substantially reduced and/or eliminated.

Figure 6:
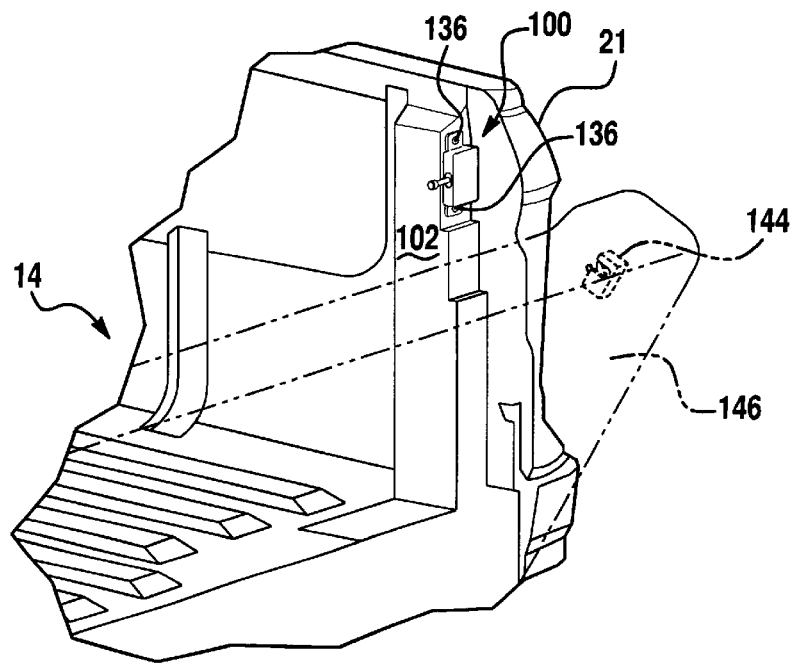
FIG. 6 is a perspective view of an anchorage assembly which is made in accordance with a second embodiment of the invention and which is operatively mounted to a vehicle cargo box.
Figure 7:
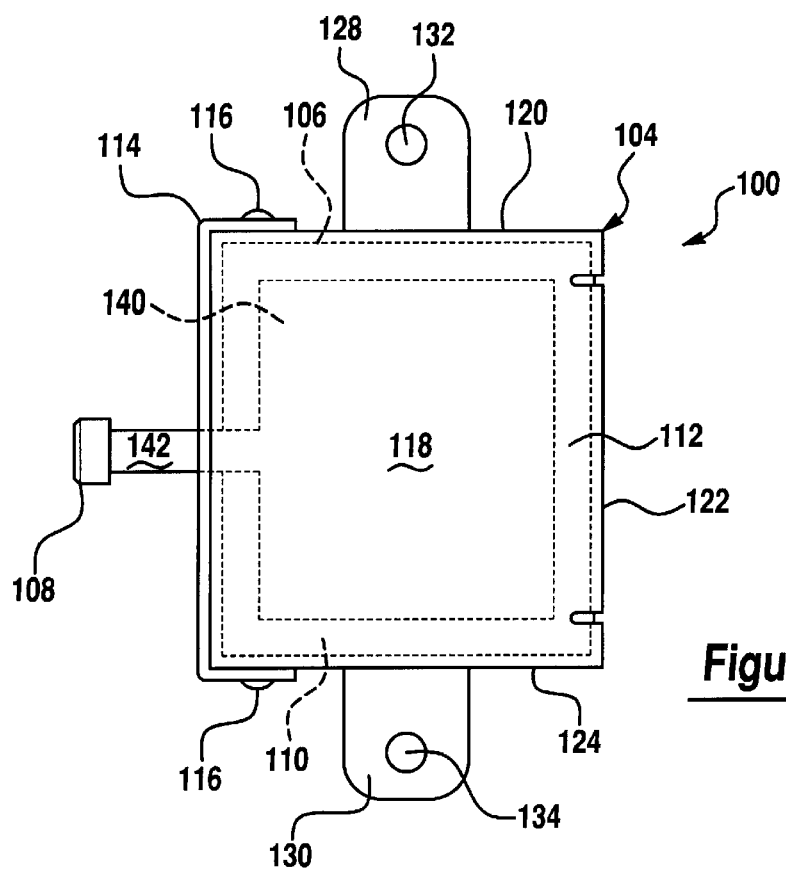
FIG. 7 is a front view of the anchorage assembly shown in FIG. 6.
Figure 8:
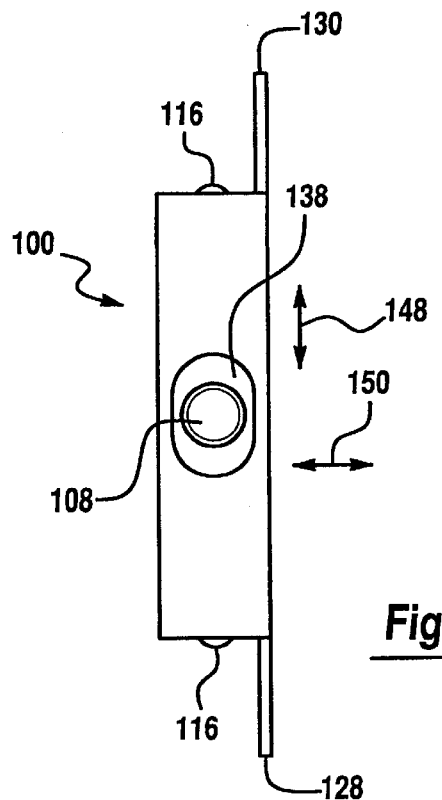
FIG. 8 is a side view of the anchorage assembly shown in FIG. 6.
Figure 9:
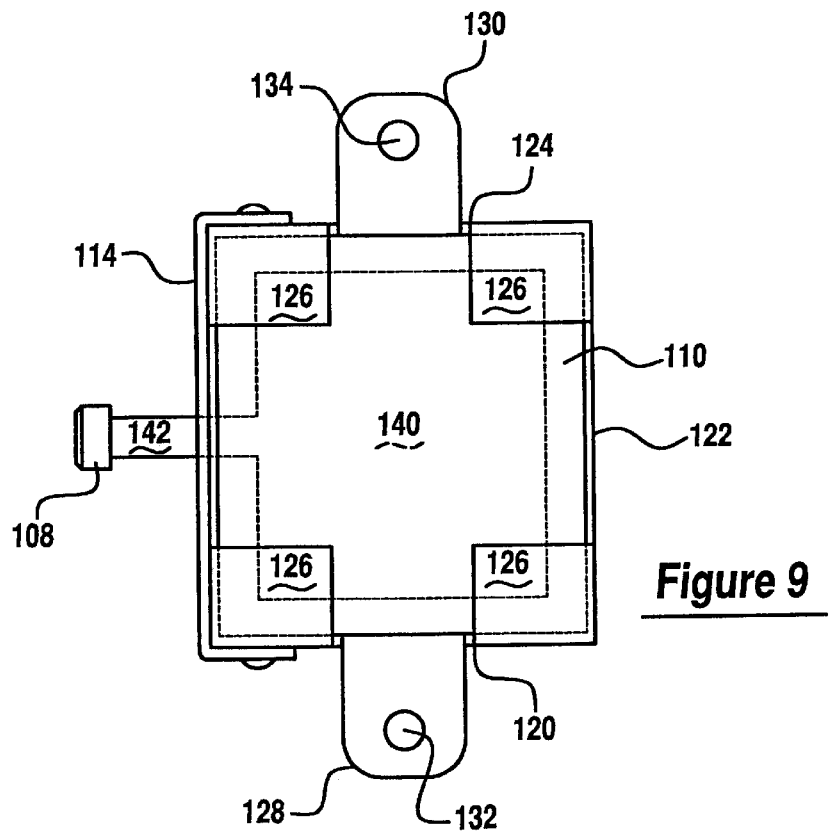
FIG. 9 is a back view of the anchorage assembly shown in FIG. 6.

Referring now to FIGS. 6–9, there is shown an anchorage assembly or latch striker assembly 100 which is made in accordance with the teachings of a second embodiment of the present invention. As shown best in FIG. 6, anchorage assembly 100 is selectively mounted and/or installed within the side wall 21 of the cargo box 14 and more particularly, is selectively mounted upon a rear "pillar" or portion 102 of the cargo box 14. While the following discussion relates to the use of assembly 100 in combination with a cargo box of a vehicle, it should be appreciated that assembly 100 may be mounted upon and/or used in combination with other portions of a vehicle and/or vehicle body and virtually any other type of moving or vibrating structure on which components or accessories are desirably and selectively attached.

Anchorage assembly 100 includes a generally square shaped housing 104, which is selectively attached to the rear pillar 102 of cargo box 14 and which includes a central cavity 106. Assembly 100 further includes an anchor, striker or member 108, which is partially disposed within cavity 106 and which is movable relative to housing 104. A resilient and deformable material, plug or member 110 is disposed within cavity 106 and engages member 108 and housing 104, thereby regulating, controlling and/or restricting the movement of member 108 relative to housing 104.

In the preferred embodiment of the invention, housing 104 includes a generally square shaped body portion or member 112 and a generally "C"-shaped cover portion or member 114. Members 112 and 114 are each preferably manufactured from a relatively strong and substantially durable and rigid material such as a metal or composite material, and are selectively attached together to cooperatively form housing 104. In the preferred embodiment, members 112, 114 are selectively coupled together by the use of a pair of substantially identical and conventional fasteners 116 which may comprise bolt and/or screw type assemblies. In other alternate embodiments, members 112 and 114 are selectively welded or heatably joined together in a conventional manner.

Body portion 112 includes a front surface or portion 118, three side surfaces or portions 120, 122, and 124, and four substantially identical and generally rectangular tab portions 126 which cooperate with front portion 118, side portions 120–124 and cover member 114 to retain material within cavity 106. Two substantially identical flanges 128, 130 are respectively integrally formed with and project from side surfaces or portions 120, 124 of housing 104. Flanges 128, 130 respectively include apertures 132, 134 which selectively receive conventional fasteners 136, thereby allowing housings 14 and assembly 100 to be selectively mounted or attached to the rear pillar or portion 102 of cargo box 14.

Cover member or portion 114 includes a generally oval aperture 138 through which member 108 extends. Aperture 138 communicates with cavity 106 and controls and/or restricts the movement of member 108 relative to housing 104. Cavity 106 is generally square-shaped or rectangular and is bounded by portions 118–126 and cover member 114.

Anchor or member 108 includes a generally square-shaped body portion 140 which is disposed within cavity 106 and a generally cylindrical rod, post or member 142 which orthogonally projects from portion 140 and which extends through aperture 138. Portion 140 is adapted to be selectively received or engaged by a conventional latch mechanism or fastener, such as latch mechanism 144 shown in FIG. 6.

Resilient material, plug, or member 110 is generally square-shaped and is preferably made or formed from a conventional resilient and deformable material such as rubber, plastic, or any other suitable deformable and resilient material. Material 110 is coupled to and/or formed around body portion 140 and abuttingly engages portions 118–126 of member 112 and cover 114. In the preferred embodiment of the invention, material 110 is formed around body portion 140 by use of a conventional molding process.

During assembly, material 110 is formed or coupled to body portion 140 and is then inserted along with body portion 140 into cavity 106. Cover member 114 is then attached to housing portion 112. Once assembled, material 110 abuttingly engages the interior surface of housing 104 (e.g., the interior surfaces of portions 118–126 and of cover 114). In this manner, material 110 restricts, controls and/or regulates the movement of member 108 relative to housing 104. Particularly, when housing 104 is assembled, material 110 holds or retains member 108 in a substantially "centered" position with respect to housing 104 and aperture 138, as shown best in FIG. 8. When forces are imparted upon member 108, material 110 deforms and allows member 108 to move in a "controlled" and/or regulated manner in the respective directions of imparted forces (e.g., in the directions of arrows 148 and 150). Furthermore, the resiliency of material 110 returns member 108 to its originally "centered" position when forces are "removed" or released from member 108.

In operation, housing 104 is selectively mounted to the rear pillar 102 or other portion of a vehicle cargo box 14. A conventional latch or fastening mechanism, such as the latch 144 formed upon tailgate or rear door 146, selectively engages or receives anchor, striker or member 108 in a conventional manner. When the vehicle is driven, vibrations and other forces are imparted upon the anchorage assembly from the vehicle body 12 and from the attached component or assembly (e.g., from rear door 146). When forces are imparted upon member 108 in the directions illustrated by arrows 148 and/or 150, material 110 deforms and allows member 108 to controllably move relative to housing 104 and cargo box 14 in the directions of the respective forces. Material 110 absorbs and dampens vibrations and other loads which are imparted upon the anchor 108, and is effective to substantially prevent impact loads from being directly and wholly transferred to latch 144 and tailgate 146, thereby protecting latch 144 and tailgate 146. The resiliency of material 110 causes member 108 to become "re-centered" once the forces imparted upon member 108 are substantially removed and/or altered. The permitted and dampened movement allowed by anchorage assembly 100 substantially reduces the loads generated at the latch mechanism 144 and substantially reduces the likelihood of failure and/or deformation of the latch mechanism 144 and the component or assembly (e.g., tailgate 146) to which the latch mechanism is attached.

It is to be understood that the invention is not limited to the exact construction or method which has been previously delineated above, but that various changes and modifications may be made without departing from the spirit and the scope of the following claims.

What is claimed is:

1. An anchorage assembly comprising:

a housing which includes an interior cavity and which is adapted to be selectively mounted to a portion of a body of a vehicle;

a member including a first portion which is disposed within said interior cavity and a second portion which is adapted to be received by a latch mechanism and which extends from said housing; and a resilient material which is disposed within said interior cavity, and which abuttingly engages said first portion of said member and said housing, effective to allow said member to controllably move relative to said housing;

wherein said housing includes a first and a second slot, and wherein said second portion of said member includes a first and a second protrusion which respectively engage said first and second slot, thereby limiting said relative movement of said member.

2. The anchorage assembly of claim 1 wherein said housing is adapted to be mounted within a stake pocket hole of a vehicle cargo box.

3. The anchorage assembly of claim 1 wherein said material is formed around said first portion of said member by use of a molding process.

4. The anchorage assembly of claim 1 wherein said material comprises a conventional rubber material.

5. The anchorage assembly of claim 1 wherein said resilient material is effective to dampen an amount of vibration transmitted thereto.

6. An anchorage assembly comprising:

a housing which includes an interior cavity and which is adapted to be selectively mounted to a portion of a body of a vehicle;

a member including a first portion which is disposed within said interior cavity and a second portion which is adapted to be received by a latch mechanism and which extends from said housing; and a resilient material which is disposed within said interior cavity, and which abuttingly engages said first portion of said member and said housing, effective to allow said member to controllably move relative to said housing;

wherein said housing includes a pair of mounting flanges which each include an aperture which is adapted to selectively receive a fastener, thereby allowing said housing to be selectively mounted to said body.

7. The anchorage assembly of claim 6 wherein said housing is adapted to be mounted within a stake pocket hole of a vehicle cargo box.

8. The anchorage assembly of claim 6 wherein said material is formed around said first portion of said member by use of a molding process.

9. The anchorage assembly of claim 6 wherein said material comprises a conventional rubber material.

10. The anchorage assembly of claim 6 wherein said resilient material is effective to dampen an amount of vibration transmitted thereto.

11. A latch striker assembly comprising:

a housing which is adapted to be selectively mounted to a vehicle and which includes an interior surface which forms a cavity;

a first member which is movable relative to said housing and which includes a first portion which is adapted to be selectively engaged by a latch mechanism, and a second portion which is disposed within said cavity; and a deformable member which is injected molded within said cavity and which is coupled to said second portion of said first member and which abuttingly engages said interior surface of said housing, thereby regulating said movement of said first member relative to said housing.

12. The latch striker assembly of claim 11 wherein said deformable member is formed from a rubber material.

13. The latch striker assembly of claim 11 wherein said deformable member is effective to dampen any vibrations transmitted thereto.

14. The latch striker assembly of claim 11 wherein said housing is adapted to be mounted to a side wall of a vehicle cargo box.

* * * * *